May 18, 1948.   E. V. EHRHARDT   2,441,694
ADJUSTABLE AIRFOIL AND BOUNDARY LAYER CONTROL.
Filed May 19, 1945   2 Sheets-Sheet 1

INVENTOR.
EARL V. EHRHARDT
BY
*W. G. Beatty*
ATTORNEY

May 18, 1948.  E. V. EHRHARDT  2,441,694
ADJUSTABLE AIRFOIL AND BOUNDARY LAYER CONTROL
Filed May 19, 1945  2 Sheets-Sheet 2
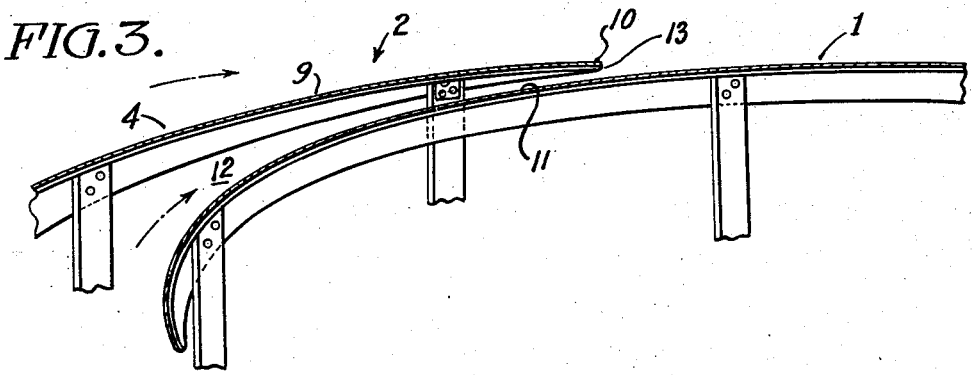
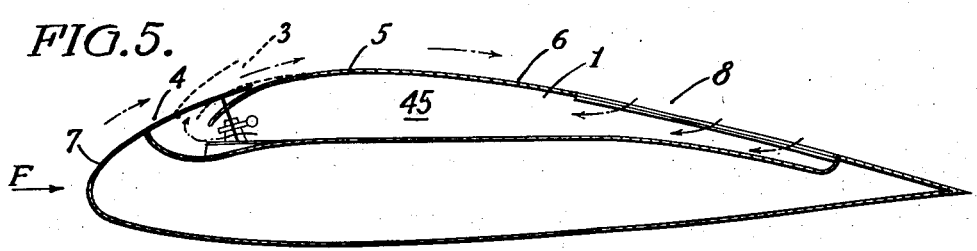
INVENTOR.
EARL V. EHRHARDT
BY
ATTORNEY Patented May 18, 1948

2,441,694

UNITED STATES PATENT OFFICE 2,441,694

ADJUSTABLE AIRFOIL AND BOUNDARY LAYER CONTROL

Earl V. Ehrhardt, Altadena, Calif.

Application May 19, 1945, Serial No. 594,646

2 Claims. (Cl. 244—40)

The invention relates to an adjustable airfoil and boundary layer control.

While the invention will be described hereafter with particular reference to an airfoil, the invention may be applied to other types of streamlined aircraft structures.

In accordance with the definition appearing on page 460 of a book entitled "Simple Aerodynamics," by C. C. Carter, fifth edition, published 1940 by the Ronald Press Company, the term "boundary layer" is descriptive of the layer of fluid such as air which is close to the surface of a body placed in a moving stream in which the impact pressure is reduced as a result of viscosity of the fluid. For a streamline airfoil in normal flight, the boundary layer and the flow of air conform to the streamline of the airfoil, with little or no turbulence, as indicated in the figure at the upper left of page 67, at the upper left of page 68, and at the top of page 330 of the above book. There are several situations in which this ideal flow does not exist, and some examples thereof are the following. For large angles of attack, turbulence, drag and a loss of lift result with the boundary layer substantially removed from the upper surface of the airfoil, as indicated in certain of the figures on pages 67 and 68 of the above book. If the angle of attack is large enough and the speed low enough, the loss of lift may be sufficient to cause the plane to stall. Also, departure of the boundary layer and the stream of air from the trailing edge of the airfoil results in a reduced amount of air on which the aileron can obtain a purchase, resulting in less effective control by the aileron as pointed out on page 330 of the above book wherein reference is made to the Handley-Page slot to overcome this difficulty.

Another circumstance where the boundary layer and air flow depart from the surface of the streamlined body with turbulence is at supersonic speeds of the airfoil, such as speeds of 650 M. P. H. or greater. In this case the forward movement of the airfoil, in effect, pushes a hole in the air faster than the air can rush into the sides of the hole thus produced, with the result that restoration of the air to its normal pressure at the trailing edge of the foil may take place in such an erratic manner and at such great pressures that the plane may become uncontrollable, as pointed out in an article entitled "Over the edge" by W. M. Kimball, appearing page 49 et seq. of "Mechanix Illustrated" for February, 1945.

A third circumstance under which the boundary layer departs from a streamline flow is in the use of a spoiler or small plate arranged to project above the upper surface of a wing to purposely disturb the smooth air flow with consequent loss of lift and increase of drag.

An object of the present invention is to modify, improve or control the boundary layer to reduce the turbulence and improve the operation of an airfoil under various circumstances. According to the invention this is accomplished by a Venturi arrangement which is motivated by the velocity of the moving stream at the leading edge of the airfoil to produce a suction or reduced pressure which is employed to remove or reduce the turbulent flow at the trailing side of the airfoil where the boundary layer is displaced, with consequent improvement in the streamline flow.

Preferably the Venturi comprises inner and outer overlapping throat members, both being adjustable. The Venturi is arranged to be collapsed so that it can conform to the streamline of the airfoil with the Venturi outlet closed so that it does not interfere with operation of the airfoil under normal conditions, means being provided for increasing the angle of attack of the Venturi with concurrent increase in the size of the outlet of the Venturi so that the turbulence is reduced somewhat in proportion to the angle of attack of the Venturi. This has the particular advantage that in taking off from a landing field, the lift of the plane may be increased by adjusting the Venturi to increase the effective thickness of the airfoil by a plate which acts somewhat as a spoiler, with this difference, however, that the turbulence thereby produced is removed or reduced by the Venturi. According to the invention, preferably the functions of the spoiler and the Venturi are accomplished by a common means so that the device is inherently self-compensating over a desired range.

According to a further feature of the invention, the angle of attack of the Venturi may be gradually increased with a concurrent increase in the size of the outlet of the Venturi until its normal size is reached and thereafter, while maintaining such normal size, the angle of attack may be still further increased over another range to operate as a brake or a spoiler in the ordinary sense without an attempt being made to compensate for the turbulence in excess of that which the Venturi can handle, so that such excess turbulence will produce drag.

According to another feature of the invention, the Venturi outlet which is in the leading edge portion of the airfoil is connected to an improved inlet through a conduit or air chamber in the airfoil, whereby at supersonic speeds such air chamber serves to cushion shock waves. The invention provides an improved inlet in the form of a plurality of elongated inlet passages which extend substantially parallel to the longitudinal axis of the aircraft i. e., parallel to the normal air flow, whereby each inlet passage is in position to serve continuously the turbulence as it advances or recedes at different positions of the breakaway of the boundary layer. For a high-speed low lift airfoil the Venturi device of this invention may be employed on both sides of the airfoil and such cushion chamber may serve in common to both thereof. For an open type of wing, the Venturi outlet and inlet may be connected through a closed conduit.

For further details of the invention, reference may be made to the drawings, wherein:

Fig. 3 is an enlarged sectional view on line 3—3 of Fig. 1 illustrating a non-adjustable Venturi device.

Fig. 5 is an enlarged vertical cross sectional view of the high-lift, low speed airfoil of Figs. 1 to 4, inclusive, the section having been taken with the adjustable Venturi of Fig. 2 on a line parallel to line 2—2.

Figure 1:
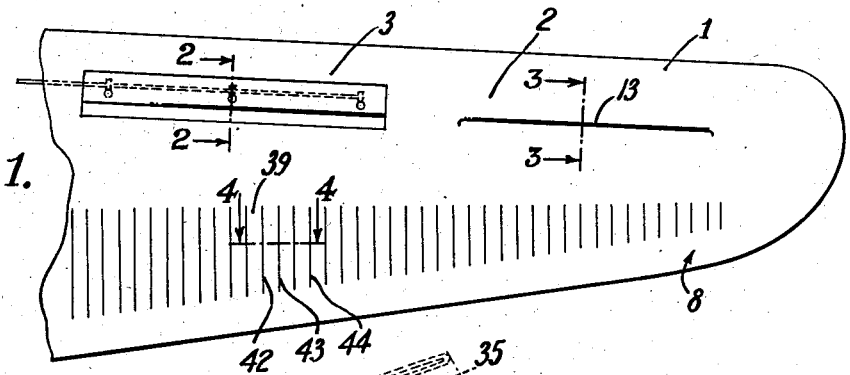
Figure 1 is a plan view with parts broken away and with the aileron omitted, of an airfoil provided with the Venturi device of the present invention.

Referring in detail to the drawings, the airfoil 1 in Fig. 1 is here illustrated as of the closed wing type, as shown in further detail in Fig. 5. The airfoil 1 is provided with a fixed Venturi 2 and an adjustable Venturi 3 although only one or both of each may be employed. The Venturis 2 and 3, as illustrated in Fig. 5, where Venturi 3 is schematically shown, are arranged at the leading edge portion fore of the apex 5 of the camber of the upper surface 6 of the airfoil. Also, the nose 7 may be fixed and form the usual portion of a continuous streamline surface, as distinguished from a movable nose or slot arrangement as proposed by Handley-Page. The Venturis 2 and 3 are actuated by the draught of air at the leading edge portion 4 of the airfoil and an inlet 8 therefor is provided in the streamline surface aft of the apex 5.

As shown in Fig. 3, the fixed Venturi 2 comprises the streamline leading edge portion 9 which serves as an upper throat member terminating at some suitable line indicated at 10 in the leading edge 4 of the airfoil. The inner throat member 11 forms a continuation of the streamline of the airfoil 1 and the surfaces 9 and 11 are spaced apart to provide a converging throat 12 terminating in a Venturi outlet 13. The draught of air at the leading edge of the airfoil produces a reduced pressure at the Venturi outlet 13 which discharges the air led to it from the inlet 8.

Figure 2:
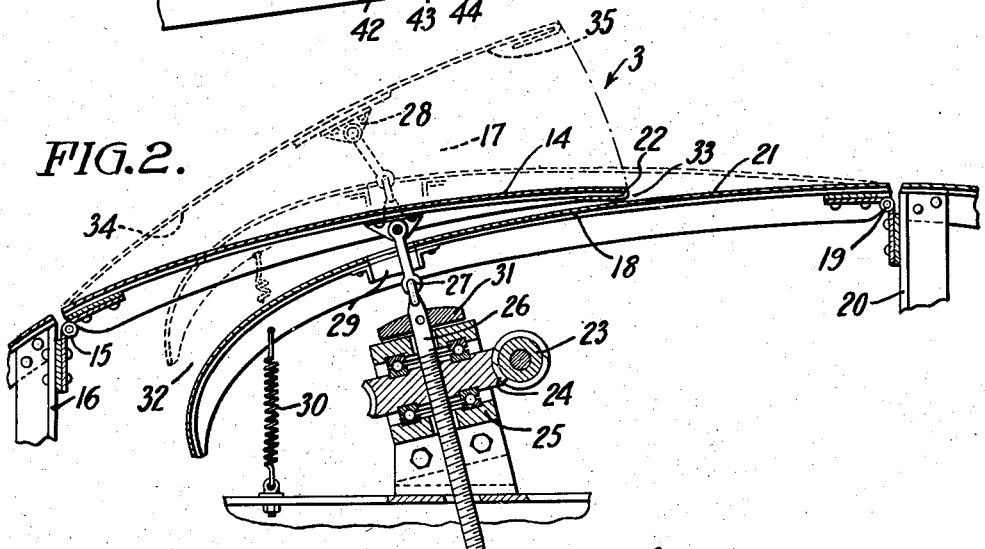
Fig. 2 is an enlarged sectional view on line 2—2 of Fig. 1, the full lines showing the Venturi collapsed or closed and the dotted lines showing the Venturi open.

The adjustable Venturi 3 as shown in Fig. 2, comprises an upper throat member 14 hinged at its leading edge, as indicated at 15, to the framework 16 of the airfoil 1. The Venturi member 14 has a curvature which forms a continuation of the streamline of the airfoil 1 and the member 14 is adapted to be moved either to a position where it will, in effect, form a continuation of the streamline of the airfoil 1 or its angle of attack may be increased to various other positions beyond the streamline of airfoil 1, as later described. The Venturi member 14 which forms one side of a throat 17 overlaps an oppositely extending inner throat member 18 pivoted at its trailing edge, as indicated at 19, to the framework 20 of the airfoil 1. The curvature of the trailing portion of the inner throat member 18 conforms to the streamline of the airfoil 1, particularly as to that portion 21 which extends aft of the trailing edge 22 of the upper throat member 14, whereby when the upper throat member 14 is collapsed or closed onto the lower throat member 18, the usual streamline of the airfoil 1 is substantially preserved. The upper throat member 14 may be moved to any desired angle of attack by means of any suitable operating means here indicated as a worm 23, having a suitable handle, not shown, worm 23 meshing with a worm gear 24 rotatably carried by a suitable bearing 25. Threaded in the axis of gear 24 is a threaded rod 26 which is advanced or retracted as the worm 23 is rotated. The upper end of rod 26 is connected by means of a link 27 to the underside of the upper throat member 14, as indicated at 28. The link 27 passes through an enlarged opening 29 in member 18 so that worm 23 may be rotated to open or close the throat member 14 within a certain range, without operating the lower throat member 18 which is held in its retracted position by a spring 30. The rod 26 carries a collar 31 which engages the sides of the opening 29, to increase the angle of attack of both the upper throat member 14 and the lower throat member 18, as a unit. The throat members 14 and 18 are spaced apart to provide a throat 32 the outer end of which 33 serves as a Venturi outlet when the upper throat member 14 is extended beyond the streamline of the airfoil 1. When the upper throat member 14 is raised enough so that the stop 31 engages the sides of the opening 29, the throat 32 is fully open and its inner end 34 converges and its outer end 35 diverges to conform to the streamline of the flow through the throat members 14 and 18. The throat members 14 and 18 each form a continuation of the streamline of the airfoil 1 and these members overlap each other and extend in opposite directions somewhat as described in connection with the fixed or non-adjustable Venturi in Fig. 3.

Figure 4:
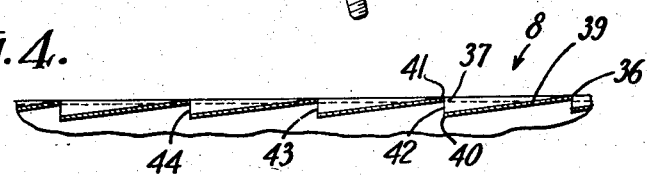
Fig. 4 is an enlarged sectional view on line 4—4 of Fig. 1, illustrating an improved inlet.

As shown in Fig. 4, the inlet 8 may take the form of a plurality of parallel slits such as 36, 37 through the surface of the airfoil 1, the strip material 39 which may be metal, between adjoining slits, being bent so that the edge 40 of one strip will be spaced from the adjacent edge 41 of the next strip, to provide an air inlet 42. A plurality of inlets like 42 is provided as indicated at 43, 44, etc. The inlets 42, 43, 44, etc., are elongated and extend in a direction substantially parallel to the longitudinal axis of the aircraft i. e., chordwise of the wing illustrated in the drawings, whereby each such inlet is in position to serve continuously the turbulence existing at different positions of the breakaway of the boundary layer.

The group of inlets such as 42, 43, 44 are referred to as the inlet 8. Air entering the inlet 8 passes through the body of the closed airfoil 1 and if desired a separate conduit 45 may be provided to lead such air to the Venturis 2 and 3.

The interior of the airfoil itself may serve as such conduit in the case of a closed type of wing.

In the operation of the Venturi and boundary layer control of Figs. 1 to 5, if it is desired to increase the effective thickness of the airfoil when taking off, the upper throat member 14 may be extended slightly without operating the lower throat member 18, and the turbulence which would otherwise be produced thereby is reduced or removed by passing the same through the inlet 8 and the conduit 45 due to the reduced pressure produced by the velocity of the air passing the Venturi outlet 33. As the angle of attack of the throat member 14 is increased, the opening of the throat 34, 35 is increased correspondingly to concurrently and proportionately reduce or remove the increased turbulence due to the increasing angle of attack of the throat member 14.

During normal flight the upper throat member 14 may be collapsed or retracted to the full line position shown in Fig. 2, where the normal streamline of the airfoil 1 is preserved. If it is desired to produce more turbulence than can be offset by the Venturi 3 in order to intentionally produce drag for braking purposes, this may be accomplished by operating the worm 23 to extend the Venturi 3 beyond that position where the throat members 14 and 18 are both operated as a unit by the rod 26.

When operating at supersonic speeds, abnormal pressure differences between the trailing and leading edges of the airfoil may be somewhat equalized due to the fact that an equalizing path is provided from the inlet 8 to the outlet of the Venturis 2 and 3, and such pressure differences may be cushioned to some extent by the cushion chamber provided by the conduit 45.

I claim:

1. A boundary layer control comprising, an outer Venturi member forming an adjustable surface portion of a streamline structure, a cooperating inner adjustable Venturi member, means for varying the angle of attack of said outer Venturi member a limited amount without varying said inner member until the Venturi opening attains a certain size, and means for varying the angle of attack of both of said Venturi members as a unit after said certain size has been reached.

2. A wing for an aircraft, said wing having a convexly cambered upper surface extending from leading to trailing edges thereof, a point of maximum camber on said upper surface defining an apex, boundary layer control means for said wing including, a rearwardly directed means forming an outlet in said surface in advance of the apex in a direction chordwise of said wing, and a cooperating aligned inlet in said surface aft of said apex in a direction chordwise of said wing, said inlet comprising means forming a plurality of elongated inlet passages extending chordwise of said wing, each of said passages having adjacent sides extending one above the other to provide openings facing spanwise of said wing.

EARL V. EHRHARDT.

REFERENCES CITED

The following references are of record in the file of this patent:

UNITED STATES PATENTS

| Number | Name | Date |
|---|---|---|
| 1,726,118 | Page | Aug. 27, 1929 |
| 1,810,693 | Alfaro | June 16, 1931 |
| 1,889,477 | Hitt | Nov. 29, 1932 |
| 1,979,184 | Ziegler | Oct. 30, 1934 |
| 2,049,573 | Stalker | Aug. 4, 1936 |
| 2,077,070 | Rose | Apr. 13, 1937 |
| 2,219,234 | Messerschmitt | Oct. 22, 1940 |
| 2,319,463 | Lear | May 18, 1943 |
| 2,321,837 | Maxwell | June 15, 1943 |
| 2,348,252 | Griswold | May 9, 1944 |

FOREIGN PATENTS

| Number | Country | Date |
|---|---|---|
| 501,548 | Germany | July 4, 1930 |
| 584,585 | Germany | Aug. 27, 1929 |